Patented July 1, 1924.

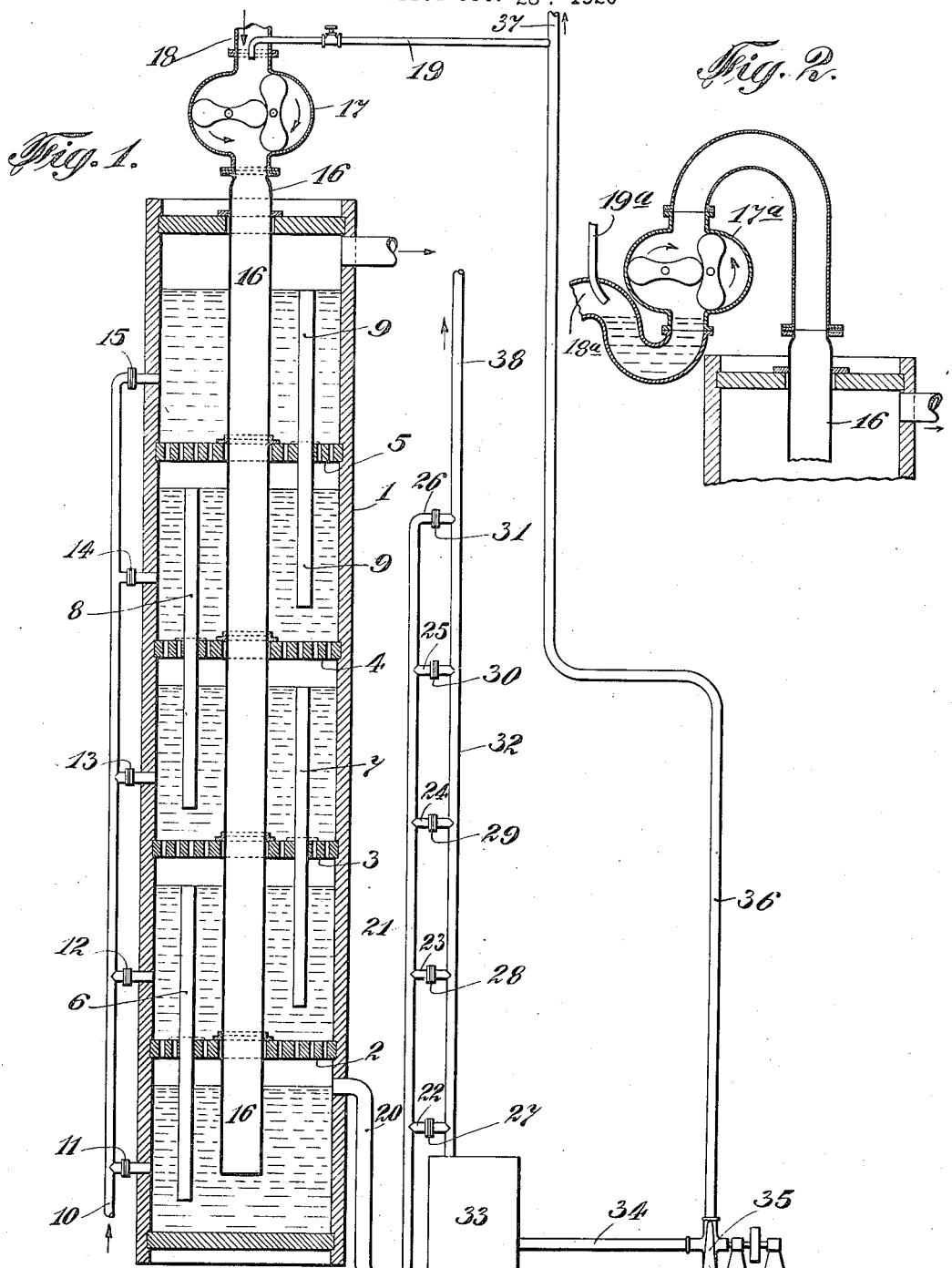

1,499,898

UNITED STATES PATENT OFFICE.

ROBERT B. WOLF, OF NEW YORK, N. Y.

METHOD OF AND APPARATUS FOR ABSORBING GASES IN LIQUIDS.

Application filed October 28, 1920. Serial No. 420,183.

*To all whom it may concern:*

Be it known that I, ROBERT B. WOLF, a citizen of the United States, residing at New York city, in the county of New York, State of New York, have invented certain new and useful Improvements in Methods of and Apparatus for Absorbing Gases in Liquids; and I do hereby declare the following to be a full, clear, and exact description of the invention, such as will enable others skilled in the art to which it appertains to make and use the same.

This invention relates to improvements in the saturation of liquids with gases, and more particularly to an improved method and apparatus for the production of acid sulfite liquor for use in the sulfite process of pulp and paper manufacture.

The acid sulfite liquor used in the sulfite process is commonly made by the milk of lime system or by the tower acid system. In the tower system, the sulfur dioxide gas is passed through towers packed with limestone over which water trickles. In the milk of lime system, the sulfur dioxide gas is passed into vessels containing milk of lime and usually provided with agitation means for promoting the reaction. For best results in the sulfite process it is important to use an acid sulfite liquor containing the proper amount of bisulfite, and a considerable excess of sulfurous acid, but it is difficult to obtain a liquor of sufficient strength by the common methods of procedure, unless refrigeration or a high pressure is resorted to.

According to the present invention, a strong acid liquor can be readily produced, and a high degree of saturation or a regulated lesser degree of saturation readily obtained. The invention is of particular value in the production of strong liquor from milk of lime and in increasing the strength of the acid liquor previously produced by either the tower or the milk of lime system.

In the practice of the improved process of the invention, for increasing the strength of sulfite liquor previously produced, by either the tower or the milk of lime system, I subject the sulfite liquor to the action of sulfur dioxide gases under pressure, and I regulate the pressure and the contact of the gases with the liquor so as to give an acid liquor of high acid content. For bringing the acid liquor to its highest degree of saturation I recirculate the liquor and bring it repeatedly into intimate contact with the strong sulfur dioxide gases, or I recirculate a part of the liquor sufficient in amount to complete the saturation and give a liquor of the required strength.

In the improved apparatus of the invention, I provide an absorption tower having a series of compartments therein for the liquor and so connected that the liquor can flow downwardly, in a regulated manner, through the compartments successively, while the gases pass upwardly through the successive bodies of liquid and are brought into intimate contact therewith. I also provide for introducing the liquor to be saturated or strengthened into any one of said compartments, so that a part only, as well as the whole of said compartments may be used for the absorption, and I provide an outlet from the bottom compartment in which I can maintain a head of liquid corresponding to the total head of liquid in the apparatus against which the gases must be introduced. In order to bring about a still further degree of saturation, I provide means for recirculating the liquor or a part of the liquor, and for bringing it into intimate contact with the fresh sulfur dioxide gases under pressure.

In the accompanying drawing, I have illustrated, in Fig. 1, an apparatus embodying the invention and adapted for the practice of the process of the invention, and in Fig. 2 a somewhat modified construction, and the invention will be further described in connection therewith, it being intended and understood that the invention will be illustrated by, but not limited to, such specific embodiments.

The apparatus illustrated is intended to be used in connection with a suitable supply of sulfur dioxide gases, such as are obtained with the usual sulfur burners, and with lime water which is to be converted into strong sulfite liquor, or with acid sulfite liquor previously produced by either the tower system or the milk of lime system and which is to be further increased in acid strength. Inasmuch as these systems, as well as the means for supplying the sulfur dioxide gases, are well known in the art, they require no detailed description or illustration.

In the apparatus illustrated, the tower 1 has a series of perforated partitions 2, 3, 4 and 5 with perforations therein of a suitable size and shape to permit the upward flow of the gases therethrough and substantially uniform distribution of such gases, while preventing or substantially preventing downward flow of liquid. These perforated partitions divide the tower into five chambers or compartments for the acid liquor, the level of which is determined by the overflow pipes 6, 7, 8 and 9 by means of which the liquor flows from one compartment to another.

When the apparatus is to be used for strengthening the finished bisulfite liquor from the regular tower system or milk of lime system, this liquor enters the apparatus through the pipe 10 and one or another of the branch pipes leading to the different compartments. These branch pipes are provided with means for controlling the flow of the liquor, the means illustrated being removable closures 11, 12, 13, 14 and 15, which serve the function of valves, so that, by shutting off all of the branch pipes except the one through which the liquor is to be introduced, the liquor can be either introduced at the lower compartment, or at one of the upper compartments.

The gas inlet is through the pipe 18 (or 18$^a$), the blower 17, (or 17$^a$) and the vertical pipe 16. The pipe 16 extends to near the bottom of the lower compartment, so that the sulfur dioxide gases introduced will be forced through the acid liquor in this compartment and then up through the perforated partitions and the liquid in the upper compartments.

In the arrangement of Fig. 1, the blower 17 discharges the mixture of liquid and gas directly down into the central tube 16. In the arrangement of Fig. 2, the blower discharges the mixture of liquid and gas upwardly and thence downwardly into the pipe 16, the blower in this case being arranged to draw the gases and liquid from the lower compartment and bring them into intimate contact and admixture before they are discharged into the pipe 16.

The outlet for the liquor from the lower compartment is indicated at 20, this pipe having an upwardly extending branch 21 and providing a liquid seal to prevent escape of the gases therethrough. Five branch pipes, 22, 23, 24, 25 and 26 connect the pipe 21 with the pipe 32. Each of these branch pipes have suitable controlling means, such as removable closures 27, 28, 29, 30 and 31 by means of which the flow through any branch pipe is permitted but flow through any lower branch pipes is prevented. When only the lower compartment is used, the liquor flows out through the liquid seal and the branch pipe 22. The branch pipe 23 is arranged at a distance above the branch pipe 22 corresponding to the head of liquid in the second compartment; and the other branch pipes are correspondingly arranged, so that, for example, the branch pipe 26 is at a distance from the bottom of the pipe 22 corresponding to the total head of liquid in the upper compartments, so that escape of gas through the liquid outlet pipe 20 is prevented.

The liquor discharged from the tower is collected in the well 33 and conveyed through the pipe 34 to the pump 35 by means of which it is forced through the pipe 36 to the liquor storage tank. A branch pipe 19 connects the pipe 36 with the gas inlet pipe 18 and has a suitable regulating valve therein. The arrangement is such that the liquor, or a part of the liquor, can be returned through the branch pipe 19 to the tower. This liquor enters the blower 17 where it is intimately mixed with the incoming gases and the resulting mixture is discharged into the vertical pipe 16. The liquor which has been strengthened in its passage through the tower is thus brought into intimate contact with the fresh strong gases entering the apparatus and the liquor thus tends to become saturated with sulfur dioxide under the pressure maintained in the pipe 16. Any gases escaping through the pipe 38 are led to the tower or milk of lime system.

In the operation of the apparatus, for the strengthening of previously formed bisulfite liquor, all of the gas from the sulfur burners, after being cooled, is drawn through the blower 17 or 17$^a$ and is there intimately admixed with such amounts of liquor as are returned through the branch pipe 19 or 19$^a$. The introduction of the acid liquor supplies a liquid seal for the blower while the further strengthening of the liquor is promoted by the intimate admixture of the gases and acid liquor and the downward passage of this mixture through the pipe 16. The gases then pass up through the liquid in the lower compartment and through the perforated partitions and any bodies of liquid contained in the upper compartments and the unabsorbed gases escape from the top of the apparatus to the regular bisulfite liquor system where the remaining sulfur dioxide is absorbed in the tower or in the milk of lime system. The finished liquor from the system may be introduced into any of the five compartments and will flow successively through the lower compartments until it is withdrawn through the pipes 20, 21, 32, 34 and 36.

If only a small pressure is required for the absorption, for example, a pressure corresponding to a head of about three feet, the finished liquor from the bisulfite liquor system will enter the lower compartment from the pipe 10 through the opened closure 11 and the liquor will pass out through the pipe 20 and the branch pipe 22, the pipe 20 providing a trap or liquid seal which will prevent escape of the gases through the pipe 20.

If an increased pressure is desired to promote the degree of saturation, one or more of the upper compartments may be filled with the acid liquor. For example, the closure 12 may be opened and the closure 11 closed so that the liquor will enter the second compartment. In this case, the corresponding closure 28 in the branch pipe 23 will be removed and the branch pipe 22 will be closed. The liquid level will thus be maintained at the overflow level in the second compartment and the pipe 21 will provide a correspondingly increased depth of liquid seal, for example, a total depth of about eight feet.

In a similar manner, where an increased pressure is desired, the liquor can be introduced into one of the upper compartments, and the pressure in the pipe 16 will then correspond to the total head of liquid in the apparatus above the outlet end of this pipe. For example, by providing a head of five feet in each of the upper compartments, a pressure can be obtained in the pipe 16 corresponding to about twenty-three feet of liquid. It will be understood that the head of liquid in the pipe 21 will correspond generally to the head of liquid in the tower by permitting the outflow to take place through the branch pipe corresponding to the compartment into which the liquor is introduced. The overflow pipes within the tower maintain the levels at the proper height in each compartment. It will be understood that the perforations in the partitions separating the compartments are so small as to prevent any material downward flow of the liquid therethrough and yet permit upward flow of the gases and insuring uniform distribution of the gases. In the drawing, the perforations have been exaggerated in size for purposes of illustration, but it will be understood that in practice these perforations will be considerably smaller.

While the liquor can be very materially increased in strength merely by passing it downwardly through the successive compartments of the tower, this strength can be still further increased and a practically perfect degree of saturation attained by recirculating a part of the liquor through the branch pipe 19, the blower and the pipe 16, especially as the blower brings about a very intimate intermixture of the liquor and gas so that a large absorbing surface is presented at the maximum pressure which is maintained in the large central tube. This tube 16 in practice can be made sufficiently large to insure a large absorbing surface during the passages of the liquid and gases therethrough, for example, a diameter of about sixteen inches in a tower having a total height of about thirty-three feet, and the tube can, of course, be provided with baffles or other devices (not shown), to retard the liquid spray and promote the absorption.

Instead of introducing finished bisulfite liquor from the milk of lime or the tower system, the complete operation of forming acid liquor of high concentration directly from lime water can with advantage be carried out according to the present invention, so that a separate bisulfite liquor system may be eliminated. When the apparatus is to be used for carrying out the complete operation, the milk of lime or limewater is introduced into one of the upper compartments and is caused to flow successively down through the lower compartments, while the sulfur dioxide gases pass upwardly in the manner previously described. By proper regulation of the feeding of milk of lime, and the provision of a sufficient number of compartments, the milk of lime will be completely converted into bisulfite in one of the intermediate compartments so that the last one or two compartments at the bottom of the tower will contain finished acid liquor which will be strengthened in sulfur dioxid content in the manner previously described. The introduction of milk of lime into one of the upper compartments insures that all of the sulfur dioxid gases passing upwardly will be completely absorbed so that there will be no escaping sulfur dioxide gases and no necessity for the provision of towers for their absorption.

The strength of the liquor in the lower compartment can be further increased by causing recirculation of a sufficient amount of this liquor and bringing it into intimate contact with the strong sulfur dioxid gases in the blower of the central pipe 16. In this way, the strength of the liquor in the lower compartment can be increased to the desired extent even though the liquor in the upper compartment contains the freshly introduced lime water. That is, the lime water introduced in one of the upper compartments is progressively acted upon in its downward flow until all of the lime has been changed to bisulfite and the bisulfite liquor will then be further increased in sulfur dioxid content and the liquor thus brought to the desired sulfur dioxide content, the final strengthening being effected under the maximum pressure of the system, as previously described.

Instead of strengthening previously formed sulfite liquor, or producing directly from lime water a strengthened acid liquor, the invention is also applicable for increasing the absorption of other gases than sulfur dioxide, or the absorption of sulfur dioxide gases by other liquors than sulfite liquors. For example, weak sulfur dioxide gas, running about five per cent sulfur dioxide, such as is obtained from smelter furnaces, can be absorbed in water or other liquor by forcing the gas through a pressure system of the character above described. The amount of gas absorbed is materially increased by the increased pressure used in the system and the intimate manner in which the gases are brought into contact with the liquid. A pressure of, for example, 15 to 20 lbs. per square inch, can be used, and the resulting liquid, containing the sulfur dioxide gas in solution, can then be subjected to heat or to vacuum or to both to drive off the sulfur dioxide which can thus be recovered in a concentrated state. Other gases can similarly be absorbed to advantage by bringing them into contact with a suitable liquid, in the manner above described.

It will thus be seen that the present invention provides an improved method and apparatus for the absorption of gases by liquids, which is particularly adapted for making sulfite liquor from lime water and for increasing the strength of such sulfite liquor, or of sulfite liquor previously formed in sulfite liquor system, to practically any desired strength up to that of maximum saturation, while the degree of saturation can be regulated either by the number of compartments containing the liquid, or by the regulation of the return of the liquor through the apparatus after it has previously been increased in strength, or in both of these ways.

It will be understood that the apparatus is made of material resistant to the action of the acid liquor or other liquor which it contains. When sulfite liquor is produced, this acid liquor will exert a protective action upon the blower and the tube 16, particularly if the blower or tube is made of metal which would otherwise tend to be attacked by the gases. Even where such protection may not be necessary or important, as where the blower is made of metal resistant to the corrosive action of the gases, it is nevertheless of importance to return the acid liquor therethrough, owing to the important function of the blower in increasing the effectiveness of intermixture of the liquid and gas and the absorption of the gases by the liquid.

While I have shown an apparatus having five separate compartments, yet it will be evident that an apparatus with a larger or smaller number of compartments will operate in a similar manner, and that the number of compartments can be varied, for example, by providing more than five compartments, where this is desirable or advantageous.

I claim:

1. An apparatus for the absorption of gases by liquids comprising a tower having a series of compartments therein, means for permitting the liquid to flow from each compartment to the next lower compartment and for causing the gases to pass upwardly through the liquid in the compartments, means for introducing the liquid into any of said compartments whereby the liquid may be maintained in a part only or in all of said compartments, and an outlet conduit from the lower compartment with means for maintaining therein a variable head of liquid sufficient to prevent escape of gas therethrough, whereby the liquid is permitted to flow from the apparatus with maintenance of the required pressure therein and prevention of escape of gases through the outlet conduit.

2. An apparatus for the absorption of gases by liquids comprising a tower having a series of compartments therein, means for permitting the liquid to flow from each compartment to the next lower compartment and for causing the gases to pass upwardly through the liquid in the compartments, means for introducing the liquid to the tower and for removing the liquor from the lower compartment, and means for returning a part of the liquor to said compartments after bringing it into intimate admixture with the gases entering the apparatus under pressure, thereby further increasing the absorption.

3. An apparatus for the absorption of gases by liquids comprising a tower having a series of compartments therein, means for permitting the liquid to flow from each compartment to the next lower compartment and for causing the gases to pass upwardly through the liquid in the compartments, means for drawing off the liquid from the lower compartment, a tube through which the gases are introduced into the lower compartment, a blower for compressing the gases passing through said tube and means for returning more or less of the liquid from one of said compartments and introducing it into said blower whereby it is brought into intimate contact with the gases and the resulting mixture is discharged into the lower compartment.

4. An apparatus for the production of acid sulfite liquor comprising a tower having a series of compartments therein, means for permitting the liquid to flow from each compartment to the next lower compartment and for causing the sulfur dioxide gases to pass upwardly through the liquid in the compartments, a large centrally arranged tube extending downwardly through the central portion of the tower to the lower compartment for introducing the sulfur dioxide gases thereto, a blower for compressing the gases passing downwardly through said tube, means for drawing off the strong acid liquor from the lower compartment and for returning more or less of the same and introducing it into said blower whereby it is brought into intimate contact with the gases and the resulting mixture discharged downwardly through said tube to the lower compartment.

5. The method of effecting the absorption of gases in liquids, which comprises subjecting a body of liquid to the action of the gas and thereby increasing its gas content, drawing off the resulting strengthened liquor and bringing more or less of it into intimate contact with fresh gas before the introduction of this gas into further bodies of the liquor, and returning said liquor and admixed gas to said bodies whereby the strength of the bodies of liquor is increased by the further absorption of the gas and by the recirculated liquor.

6. The method of effecting the absorption of gases by liquids, which comprises subjecting a series of bodies of such liquid to the action of the gas by countercurrent circulation, drawing off the resulting liquor and bringing more or less of the same into intimate contact with fresh gas before the introduction of the gas into further bodies of the liquor and returning said liquor to the bodies of liquor of highest gas content to effect a further increase in the gas content of the same.

7. The method of producing acid sulfite liquor of high strength which comprises subjecting a body of such liquor to the action of sulphur dioxide gases and thereby increasing its strength, drawing off the resulting strengthened liquor and bringing more or less of it into intimate contact with the strong sulphur dioxide gases before the introduction of these gases into further bodies of liquor, and returning the said liquor and admixed gases to said bodies, whereby the strength of the bodies of liquor is increased by the further absorption of sulfur dioxide and by the recirculated liquor.

8. The method of increasing the strength of acid sulfite liquor which comprises subjecting a series of bodies of such liquor to the action of sulfur dioxide gases by a counter-current circulation, drawing off the resulting acid liquor and bringing more or less of the same into intimate contact with the strong sulfur dioxide gases before the introduction of these gases into further bodies of liquor, and returning the said acid liquor to the bodies of liquor of highest sulfur dioxide content to effect a further increase in the strength of the same.

9. The method of producing acid sulfite liquor which comprises subjecting milk of lime to the progressive action of sulfur dioxide gases to convert the milk of lime into bisulfite liquor and to strengthen the liquor in sulfur dioxide content, drawing off the resulting acid liquor and bringing more or less of the same into intimate contact with the strong sulfur dioxide gases, and returning the resulting mixture of sulfur dioxide gases and liquor to further bodies of liquor in which the sulfur dioxide is being absorbed, whereby the sulfur dioxide content of the same is further increased.

10. The method of producing acid sulfite liquor of high strength which comprises subjecting milk of lime to the action of sulfur dioxide gases with resulting production of acid sulfite liquor, and increasing the strength of the resulting liquor in acid by subjecting the same to the action of sulfur dioxide gases and by drawing off the resulting strengthened acid, bringing it into contact with the strong sulfur dioxide gases from the sulfur burner, and returning the mixture of liquor and gases to the said bodies of liquor in which the sulfur dioxide is being absorbed.

11. The method of increasing the strength of acid sulfite liquor, which comprises forcing a mixture of such liquor and sulfur dioxide gases through a blower, whereby the acid liquor is brought into intimate contact with the gases and the blower is protected from the corrosive action of the gases by the presence of the acid sulfite liquor 12. The method of absorbing sulfur dioxide gases in acid sulfite liquor and of enriching the liquor in sulfur dioxide, which comprises compressing the gases by passing them through a suitable compressor or blower, admixing the sulfite liquor with the gases before or during their passage through the blower and thereby effecting an intimate contact of the liquor and gases and protecting the blower during compression, and discharging the resulting mixture of compressed gases and liquor in an intimate state of admixture, downwardly in the form of a shower, whereby a further absorption of the gases by the liquor is effected under pressure.

13. The method of strengthening acid sulfite liquor which comprises passing strong sulfur dioxide gases from the burner through a compression pump or blower, admixing the liquor with the gases passing through the blower, whereby an intimate intermixture of the gases and acid is effected, and maintaining the liquor in contact with the resulting compressed gases to promote further absorption.

In testimony whereof I affix my signature.

ROBERT B. WOLF.